United States Patent [19]
Zuffada et al.

[11] Patent Number: 5,065,240
[45] Date of Patent: Nov. 12, 1991

[54] METHOD AND DEVICE FOR AUTOMATICALLY SELECTING THE DEMODULATION STANDARD OF A VIDEO SIGNAL, USEFUL WITH AN INTERMEDIATE FREQUENCY DEMODULATOR

[75] Inventors: Maurizio Zuffada, Milan; Fabrizio Sacchi, Gambarana, both of Italy

[73] Assignee: SGS Thomson Microelectronics S.r.l., Milan, Italy

[21] Appl. No.: 281,017

[22] Filed: Dec. 6, 1988

[30] Foreign Application Priority Data

Dec. 15, 1987 [IT] Italy ............................... 23014 A/87

[51] Int. Cl.$^5$ ............................................ H04N 5/14
[52] U.S. Cl. ........................................ 358/160; 358/188
[58] Field of Search ................................. 358/160, 188

[56] References Cited

FOREIGN PATENT DOCUMENTS 2208729 9/1972 Fed. Rep. of Germany ...... 358/188
0127479 7/1983 Japan ............................... 358/188

Primary Examiner—John W. Shepperd
Assistant Examiner—David E. Harvey
Attorney, Agent, or Firm—Rosen, Dainow & Jacobs

[57] ABSTRACT

A method, and related device, for automatically selecting the demodulation standard of a video signal, useful with an intermediate frequency demodulator, which has an output for the demodulated signal and a so-called standard selecting input pin, consists of detecting the polarity of the demodulated signal at the output of the demodulator and comparing that polarity with the polarity of the input signal to the demodulator. The voltage value on the standard selecting pin is changed over on detecting a different modulation polarity between the input and output video signals to/from the demodulator to enable the latter to operate to the correct standard at all times.

7 Claims, 2 Drawing Sheets

1

METHOD AND DEVICE FOR AUTOMATICALLY SELECTING THE DEMODULATION STANDARD OF A VIDEO SIGNAL, USEFUL WITH AN INTERMEDIATE FREQUENCY DEMODULATOR

DESCRIPTION

This invention relates to a method and a device for automatically selecting the demodulation standard of a video signal, useful with an intermediate frequency demodulator having an output for the demodulated signal and an input pin commonly referred to as the standard selecting pin.

BACKGROUND OF INVENTION

As is known, TV transmission standards differ from one another by a considerable number of parameters, but may be categorized into two broad groups or families according to the, positive or negative, type of modulation of the reception signal.

Positive or negative modulation is the term used to define the difference between the positive and negative values of the video picture tonality. More specifically, an increase in the amplitude of the carrier waveform of a broadcast picture is referred to as positive modulation when an increase occurs in the brightness of a scene being taken in front of a TV camera. By converse, negative modulation occurs when an increase in the scene brightness produces a decrease in modulation amplitude.

A first group of TV standards comprehend the negative video modulation standards identified by the characters B, C, D, K, H, I, K1, M, and N.

A second group comprehend the positive video modulation standards identified by the characters A, C, E, and L.

A TV set intended for operation on signals from either of the above-referenced groups requires that it be equipped with an intermediate frequency demodulator which can operate on both positive and negative modulation signals. Furthermore, a properly operating demodulator will output a demodulated video signal with downward synchros (negative modulation) independently of the input signal modulation.

The prior art currently provides demodulators which are embodied as integrated circuits having a contact terminal pin commonly known as the standard selecting pin. By applying two different DC voltage levels to this pin, correct demodulation can be achieved for the signals in the aforesaid groups.

Such voltage levels are either adjusted by means of a control knob on the TV set or possibly a remote control unit associated therewith.

That prior approach, while substantially serving its purpose, has a drawback in that the adjustment of the TV standard is left at the discretion of the user who is not, however, able to tell the polarity of the video signal modulation.

SUMMARY OF INVENTION

The technical problem that underlies this invention is to provide a method, and related device, having such respective performance and structural characteristics as to afford automatic selection of the demodulation standard on which a video signal intermediate frequency demodulator is to operate, and to overcome the limitations of the cited prior art.

2

This problem is solved by a method of the type specified above being characterized in that it comprises the steps of:
- detecting the polarity of the demodulated signal at the demodulator output;
- comparing that polarity with the polarity of the input signal to the demodulator; and
- changing the voltage value at the standard selecting pin on a different polarity being detected between the input signal and the output signal to/from the demodulator.

The invention also concerns a device for automatically selecting the demodulation standard of a video signal, useful with an intermediate frequency demodulator having an output for the demodulated signal and an input pin commonly referred to as the standard selecting pin, characterized in that it comprises:
- a regenerated circuit with first and second inputs respectively connected to a positive supply pole and the demodulator output, said regenerated circuit having an output connected to one end of a capacitor having the other end grounded, an operational amplifier having the inverting input connected to a positive reference pole and the non-inverting input connected to said capacitor; and
- a storage cell having a first input connected to the output of said operational amplifier and a second or preset input adapted to receive a step pulse of predetermined duration;
- said storage cell having an output connected to said standard selecting pin.

The features and advantages of the inventive method will become apparent from the following detailed description of the device for implementing it, given herein by way of illustration and not of limitation with reference to the accompanying drawings.

DETAILED DESCRIPTION OF PREFERRED EMBODIMENTS

Figure 1:
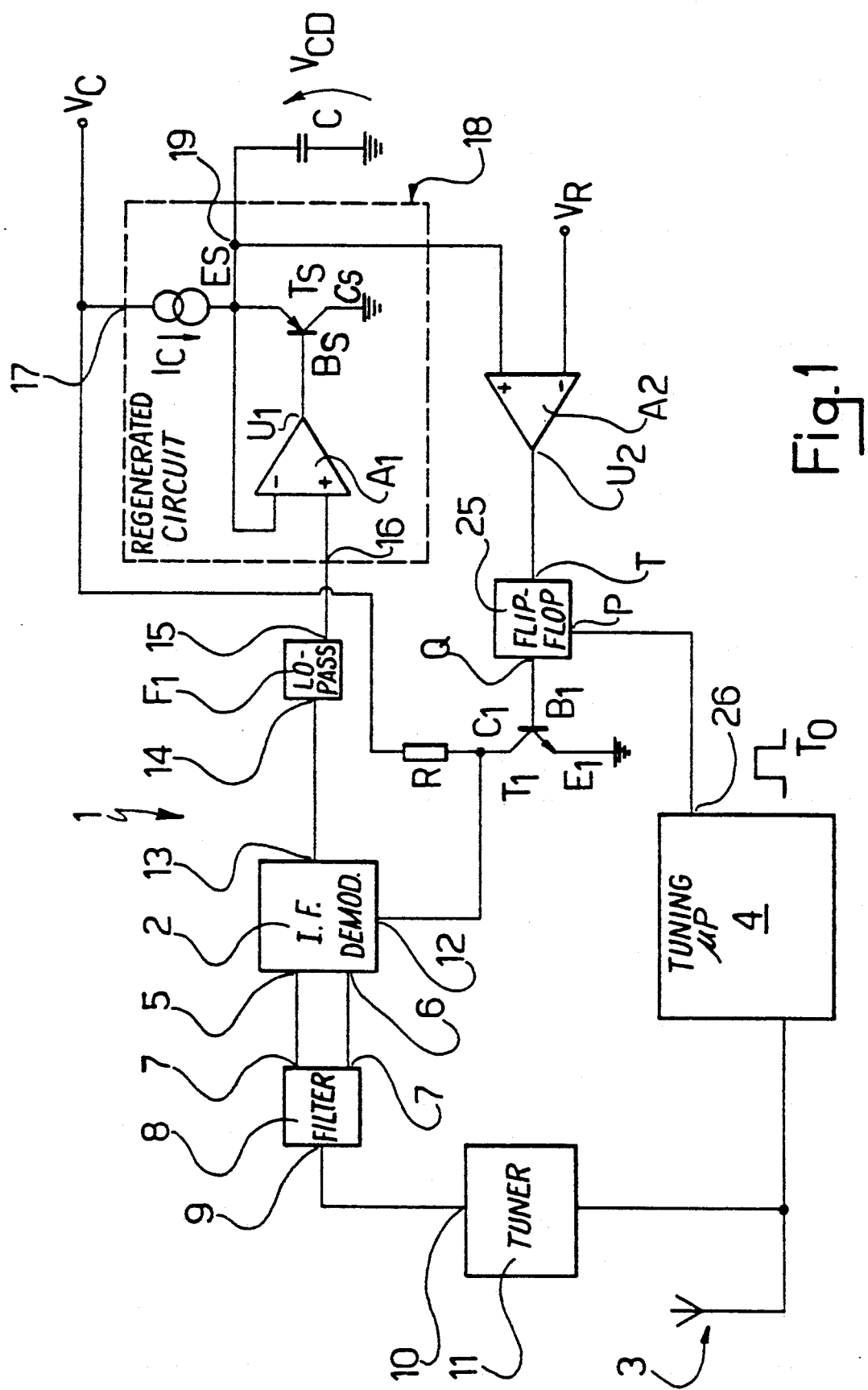
FIG. 1 is a schematic block diagram of the device according to the invention.

With reference to the drawings views, the numeral 1 comprehensively and schematically designates a device for automatically selecting the demodulation standard of a video signal, for use with an intermediate frequency demodulator 2. The device 1 would be incorporated to a TV set, not shown because to a conventional design, including a tuning microprocessor 4 with an input connected to an antenna 3 to detect the appearance thereon of a video signal carrier waveform.

The intermediate frequency demodulator 2, which may be of the multistandard type, for example, as available on the market with the designation TDA 8120 and manufactured by S. C. G. Thomson, has inputs 5 and 6 connected to respective outputs of a filter 8 which has, in turn, an input 9 connected to the output 10 of a tuner 11 which receives the signals from the antenna 3.

The demodulator 2 is embodied by an integrated circuit and provided with a special pin 12, commonly referred to as standard selecting pin, to which a voltage signal is applied effective to control switching of the demodulator 2 to operate on a different TV standard.

The demodulating circuit 2 has an output 13 through which a demodulated video signal is transmitted. That output 13 is connected to an input 14 of a low-pass filter F1 the output 15 whereof is connected directly to an input 16 of a regenerated circuit generally indicated at 18. That circuit 18 has another input 17 connected to a positive supply pole VC.

More specifically, that regenerated circuit 18 includes an operational amplifier A1 having the non-inverting (+) input connected directly to the output 15 of the filter F1. That amplifier A1 has an output U1 connected to the base BS of a pnp-type transistor TS having its collector CS connected to ground and its emitter ES feedback-connected to the inverting (−) input of the amplifier A1.

The emitter ES is also connected as input 17 to the positive voltage pole VC via a current source IC. That emitter ES is further connected as output 19 of the regenerated circuit 18 to one end of a capacitor C which has the other end connected to ground.

That output 19 is also connected to the non-inverting (+) input of a second operational amplifier A2 which has its inverting (−) input connected directly to a positive reference voltage pole VR at 4.5 Volts.

That amplifier A2 has an output U2 connected directly to an input T of a storage cell 25 consisting of a T-type flip-flop also having a second or preset input P connected to an output of the microprocessor 4 and adapted to receive a step pulse $T_0$ of predetermined duration.

The storage cell 25 has an output Q connected to the base B1 of an npn-type transistor T1 which has the emitter E1 connected to ground. The transistor T1 has the collector C1 connected both to the positive supply pole VC, via a resistor R, and to said standard selecting pin 12 of the demodulator 2.

Making now reference to FIGS. 2 to 5, there are shown respective waveforms of time-varying voltage signals present in the device 1 according to the invention.

Figure 2:
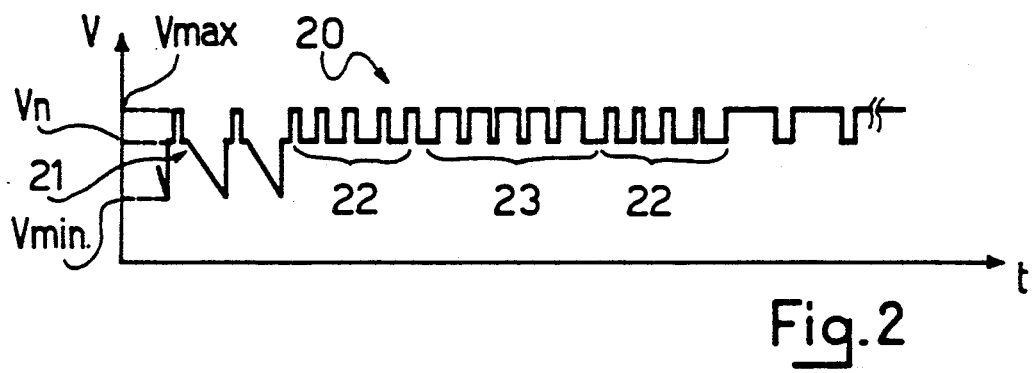
FIGS. 2 to 5 are respective schematic views of waveforms of signals present in the device shown in FIG. 1.

Indicated at 20 in FIG. 2 is the waveform of a positive modulation video signal with upward synchro pulses 21, being demodulated by a negative modulation-operating circuit, and at $V_{MAX}$ the highest value, equal to 6 Volts, of the demodulated signal 20.

The pulses 22 and 23 of the demodulated signal 20 are respectively the so-called equalization pulses and serrated pulses which form together the so-called vertical synchronism; their levels lie between said value $V_{MAX}$ and the value $V_N$ of the black level.

Figure 3:
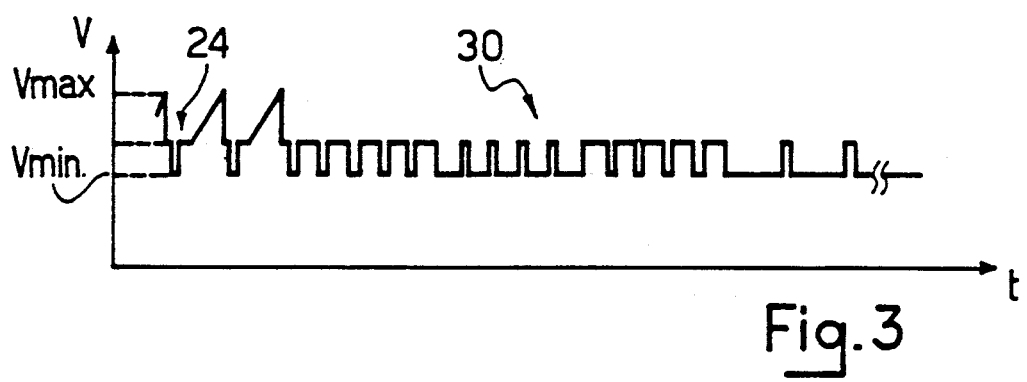

In FIG. 3, there is shown at 30 the waveform of a negative modulation video signal demodulated through a circuit operating in the negative modulation mode with downward horizontal synchro pulses 24.

Figure 4:
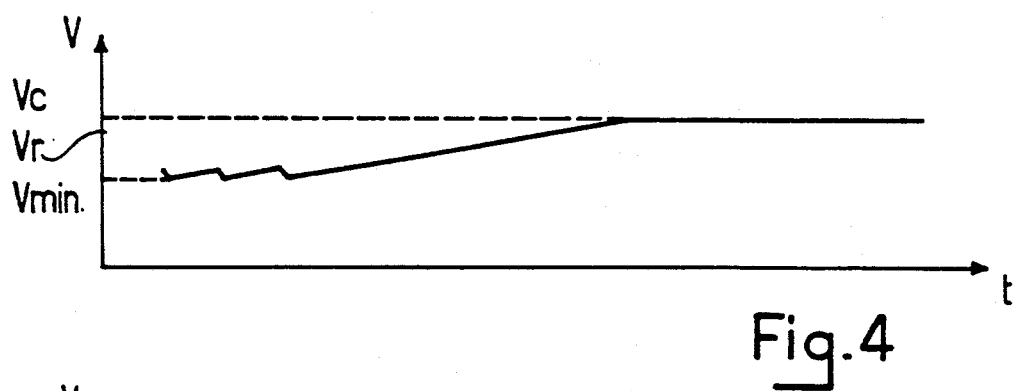

FIG. 4 shows the behavior, as a function of time t, of the voltage $V_{CD}$ across the capacitor C when on the inputs of the demodulator 2 there appears a positive modulation video signal as shown in FIG. 2. That voltage $V_{CD}$ may reach a top or maximum value equal to the value of the black level voltage at 5 Volts.

Figure 5:
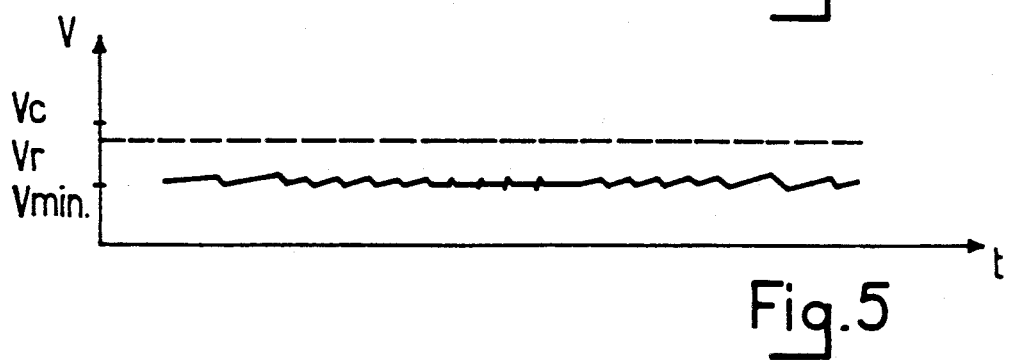

FIG. 5 shows instead the schematical behavior of the voltage $V_{CD}$ across the capacitor C when a negative modulation video signal as shown in FIG. 3 appears on the demodulator inputs, also as a function of time.

The method, according to this invention, for automatically selecting the demodulation standard of a video signal will be now described.

A starting state of operation is assumed whereby to the pin 12 of the demodulator 2 is applied a voltage having a high logic value which sets it into its positive-modulation operating mode, while on the antenna 3 a video signal carrier is present.

Under such conditions, the microprocessor 4 which tune adjusts the TV set will output, on the output 26, a stepwise pulsive signal $T_0$ having a predetermined duration, e.g. of 100 milliseconds. The duration of that pulse $T_0$, also referred to as the preset pulse, will depend on the type of the TV set.

The preset pulse $T_0$ is applied to the input P of the storage cell 25, which will switch the output Q to a logic high over the entire duration of the pulse $T_0$.

Accordingly, the transistor T1 will be energized to operate in saturation and bring the voltage on the standard selecting pin 12 to a logic low.

The demodulator 2 will perceive this state as a command to operate as if a negative modulation signal 30 were present at the inputs 5 and 6.

The first step of the method according to the invention consists of detecting the polarity of the demodulated signal at the output 13 of the demodulator 2. Since this signal may have either of the waveforms, 20 or 30, shown in FIGS. 2 and 3, respectively, there may be two different cases to consider.

Case A

The waveform of the input signal to the demodulator 2 is of the type indicated at 20 in FIG. 2, i.e. a positive modulation signal.

Since in the starting state the pin 12 was at a high logic voltage value, and due to pulse $T_0$ pin 12 was brought low, the demodulator 2 will be set for operation on negative modulation, and accordingly, cannot demodulate that input signal 20 correctly.

At this stage, the polarity of the demodulated signal is compared to a reference value representative of the difference in the polarity of the input signal to the demodulator. For this purpose, the regenerated circuit 18, capacitor C, and second amplifier A2 are brought into action.

The voltage $V_{CD}$ across the capacitor C tends to increase due to the charge supplied by the current source IC. However, this voltage $V_{CD}$ is also fed back to the inverting (−) input of the amplifier A1 in the circuit 18, which will tend to discharge the capacitor C and activate the transistor TS.

During the periods spanned by the segments 22 and 23 of the vertical synchronism of the demodulated signal 20, the capacitor C will tend to discharge down to the black level $V_N$ at 5 Volts. Furthermore, if the following equation is satisfied, $$\frac{I_C}{C} \cdot \frac{n}{f_n}(VR - V_{MIN}) = 1.5V$$

where n is the number of segments 22 and 23 of the demodulated signal 20, $f_n$ is the horizontal frequency, VR is the reference voltage applied to the inverting (−) input of the amplifier A2, and $V_{MIN}$ is the least voltage value (3 Volts) of the demodulated signal 20, then at a predetermined point in time (see FIG. 4) the voltage $V_{CD}$ across the capacitor will exceed the reference voltage VR and energize the amplifier A2.

That point in time depends on the values of the current source IC and the capacitor C, which laboratory tests carried out at the Applicant's facilities have led to select in a mutual ratio which is 0.5 times the horizontal frequency $f_n$.

The amplifier A2 will output, on its output U2, a voltage signal effective to drive the input T of the storage cell 25.

On the preset pulse $T_0$, on the input P of the storage cell 25 going to a logic low, the pulse on the other input T of the storage cell 25 will switch the output Q to a logic low and turn off the transistor T1. The pin 12 is brought, therefore, back to a logic high, and the demodulator 2 driven to operate correctly on positive modulation signals.

As a result, the signal on the output 13 of the demodulator 2 will have the waveform 30 (FIG. 3), with downward synchro pulses 24, which is the output desired.

The voltage $V_{CD}$ across the capacitor C shall then show the behavior according to FIG. 5, at values which are still lower than the reference voltage VR, and hold the amplifier A2 de-energized.

Case B

In case the input signal to the demodulator has instead negative modulation, the demodulator 2 finds itself already in such a starting state after pulse $T_0$ as to be able to operate on that modulation polarity. Accordingly, the waveform 30 will appear on the output 13.

In this case, the voltage $V_{CD}$ across the capacitor C behaves as shown in FIG. 5, and the output U2 of the amplifier A2 is held at a logic low along with the input T of the storage cell 25.

The output Q of the memory 25 stays at a logic high and hold the transistor T1 saturated, while holding low the voltage at the pin 12 of the demodulator 2 and enabling the latter to continue correct operation on negative modulation.

Thus, the device of this invention affords the important advantage of stabilizing the video signal demodulator to operate at all times to a correct standard, and to automatically change over on the occurrence of a change of polarity in the modulation of the signal received on the antenna in the tuning stage.

We claim:

1. A method for automatically selecting the demodulation standard of a video signal, for use with an intermediate frequency demodulator having an output for the demodulated signal and an input selecting pin, the applied voltage to which determines whether the demodulator is in its positive or its negative demodulating mode, characterized in that it comprises the steps of:
   (a) detecting, and producing a signal representative of, the polarity of the demodulated signal at the demodulator output;
   (b) comparing the signal produced in step (a) with a signal value representative of the polarity of the input signal to the demodulator;
   (c) changing the voltage value at the selecting pin in response to the step (b) comparison indicating no polarity match between the input signal and the output signal to/from the demodulator;
   (d) step (a) is carried out by picking up the demodulated signal from said output, applying that signal to the input of a regenerated circuit having a second input connected to a positive supply pole and being adapted to charge a capacitor, applying the voltage value across said capacitor to one input of an operational amplifier having the other input connected to a reference voltage pole.

2. A method according to claim 2, characterized in that step (b) is effected by applying the signal at the output of said operational amplifier to the input of a flip-flop type of storage cell whose output is linked operatively to a second input adapted to receive a step pulse of predetermined duration.

3. A method according to claim 2, characterized in that step (c) is linked operatively to the logic voltage value at the output of said storage cell.

4. A device for automatically selecting the demodulation standard of a video signal, for use with an intermediate frequency demodulator having an output for the demodulated signal and an input selecting pin, the applied voltage to which determines whether the demodulator is in its positive or its negative demodulating mode, characterized in that it comprises:
   a regenerated circuit having first and second inputs respectively connected to a positive supply pole and the demodulator output, said circuit having an output connected to one end of a capacitor having the other end grounded;
   an operational amplifier having its inverting input connected to a positive voltage reference pole and its non-inverting input connected to said capacitor; and
   a storage cell having a first input connected to the output of said amplifier and a second or preset input adapted to receive a step pulse of predetermined duration;
   said storage cell having an output connected to said selecting pin.

5. A device according to claim 4, characterized in that said regenerated circuit comprises an operational amplifier having its non-inverting input connected to the demodulator output and its inverting input and its output respectively connected to the emitter and the base of a pnp transistor with a grounded collector, said emitter being also connected to a positive supply pole via a current source and to one end of said capacitor.

6. A device according to claim 4, characterized in that a low-pass filter is provided between said regenerated circuit and the demodulator output.

7. A device according to claim 4, characterized in that the output of said storage cell is connected to the base of an npn transistor having its emitter grounded and its collector connected both to a positive pole via a resistor and to said pin of the demodulator.

* * * * *